(12) United States Patent
Lederman

(10) Patent No.: US 6,569,477 B2
(45) Date of Patent: *May 27, 2003

(54) HIGHLY SOLUBLE AND STABLE MINERAL SUPPLEMENTS CONTAINING CALCIUM AND MAGNESIUM AND METHODS OF MAKING

(75) Inventor: Steven N. Lederman, Beverly Hills, CA (US)

(73) Assignee: Mintech, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 09/863,016

(22) Filed: May 21, 2001

(65) Prior Publication Data
US 2002/0114868 A1 Aug. 22, 2002

Related U.S. Application Data

(63) Continuation-in-part of application No. 09/265,035, filed on Mar. 9, 1999, now Pat. No. 6,235,322.

(51) Int. Cl.⁷ ............................ A23L 1/304; A23L 2/00
(52) U.S. Cl. ...................... 426/74; 426/443; 426/444; 426/590
(58) Field of Search ............................ 426/74, 590, 443, 426/444

(56) References Cited

U.S. PATENT DOCUMENTS

| | | |
|---|---|---|
| 3,894,148 A | 7/1975 | Ecker |
| 4,042,684 A | 8/1977 | Kahm |
| 4,309,417 A | 1/1982 | Staples |
| 4,322,407 A | 3/1982 | Ko |
| 4,448,770 A | 5/1984 | Epting, Jr. |
| 4,551,342 A | 11/1985 | Nakel et al. |
| 4,722,847 A | 2/1988 | Heckert |
| 4,725,427 A | 2/1988 | Ashmead et al. |
| 4,737,375 A | 4/1988 | Nakel et al. |
| 4,738,856 A | 4/1988 | Clark |
| 4,814,177 A | 3/1989 | Walsdorf et al. |
| 4,830,862 A | 5/1989 | Braun et al. |
| 4,851,221 A | 7/1989 | Pak et al. |
| 4,867,977 A | 9/1989 | Gailly et al. |
| 4,871,554 A | 10/1989 | Kalala et al. |
| 4,874,606 A | 10/1989 | Boyle et al. |

(List continued on next page.)

FOREIGN PATENT DOCUMENTS

| | | |
|---|---|---|
| WO | 92/19251 | 11/1992 |
| WO | 97/21356 | 6/1997 |
| WO | 99/11149 | 3/1999 |
| WO | 00/18258 | 4/2000 |

OTHER PUBLICATIONS

U.S. Ser. No. 09/162,864, "Low Acid Beverages Supplemented With Nutritional Calcium Sources", filed Sep. 29, 1998, Abandoned—Not Published.

Ascherio et al., "Intake of Potassium, Magnesium, Calcium, and Fiber and Risk of Stroke Among US Men," Circulation. (1998) 98:1198–1204.

(List continued on next page.)

Primary Examiner—Helen Pratt
(74) Attorney, Agent, or Firm—Hogan & Hartson L.L.P.

(57) ABSTRACT

The present invention provides novel compositions containing calcium and/or other minerals (as single mineral compositions or as multiple mineral compositions), methods for making these compositions, and methods for delivering the compositions. The compositions provide soluble bioavailable calcium and/or other minerals at a high concentration due to the high solubility attained through the processing method contained in this patent. Addition by these methods of other mineral(s) to calcium increases the stability and solubility of the calcium. The compositions of the present invention are powders that can be reconstituted in aqueous solutions. The compositions of the present invention also are very stable, allowing for a long shelf life of the compositions and of foods supplemented with the compositions.

56 Claims, 6 Drawing Sheets

U.S. PATENT DOCUMENTS

| | | |
|---|---|---|
| 4,946,679 A | 8/1990 | Thys-Jacobs |
| 4,981,687 A | 1/1991 | Fregly et al. |
| 4,992,282 A | 2/1991 | Mehansho et al. |
| 4,994,283 A | 2/1991 | Mehansho et al. |
| 5,028,446 A | 7/1991 | Saleeb et al. |
| 5,032,411 A | 7/1991 | Stray-Gundersen |
| 5,075,499 A | 12/1991 | Walsdorf et al. |
| 5,114,723 A | 5/1992 | Stray-Gundersen |
| 5,118,513 A | 6/1992 | Mehansho et al. |
| 5,147,650 A | 9/1992 | Fregly et al. |
| 5,236,712 A | 8/1993 | Fregley et al. |
| 5,270,297 A | 12/1993 | Paul et al. |
| 5,292,538 A | 3/1994 | Paul et al. |
| 5,294,606 A | 3/1994 | Hastings |
| 5,389,387 A | 2/1995 | Zuniga et al. |
| 5,401,524 A | 3/1995 | Burkes et al. |
| 5,422,128 A | 6/1995 | Burkes et al. |
| 5,445,837 A | 8/1995 | Burkes et al. |
| 5,468,506 A | 11/1995 | Andon |
| 5,474,793 A | 12/1995 | Meyer et al. |
| 5,500,232 A | 3/1996 | Keating |
| 5,587,179 A * | 12/1996 | Gergely et al. ............. 424/466 |
| 5,626,884 A | 5/1997 | Lockett |
| 5,639,502 A | 6/1997 | Behringer et al. |
| 5,851,578 A | 12/1998 | Gandhi |
| 6,235,322 B1 * | 5/2001 | Lederman .................... 426/74 |

OTHER PUBLICATIONS

Schaafsma, "Bioavailability of calcium and magnesium," European Journal of Clinical Nutrition (1997) 51:13–16.

Yasuhiro et al., "Dietary Magnesium Supplementation Affects Bone Metabolism and Dynamic Strength of Bone in Ovariectomized Rats," The Journal of Nutrition (2000) 130:216–220.

Abrams et al., "Calcium and magnesium balanced in 9–14–y–old children," The American Journal of Clinical Nutrition (1997) 66:1172–177.

Abrams, "The Relationship Between Magnesium and Calcium Kinetics in 9–to 14–Year–Old Children," Journal of Bone and Mineral Research (1998) 13:149–153.

* cited by examiner

HIGHLY SOLUBLE AND STABLE MINERAL SUPPLEMENTS CONTAINING CALCIUM AND MAGNESIUM AND METHODS OF MAKING

RELATED APPLICATION

The present invention is a continuation-in-part application of U.S. patent application Ser. No. 09/265,035, filed Mar. 9, 1999, entitled "Highly Soluble and Stable Mineral Supplements Containing Calcium and Magnesium", to issue May 22, 2001, as U.S. Pat. No. 6,235,322.

FIELD OF THE INVENTION

The present invention relates to nutritional sources of solubilized calcium. More particularly, the present invention relates to sources of solubilized calcium having improved shelf life and stability.

BACKGROUND OF THE INVENTION

Minerals are an essential part of the human diet. Sufficient quantities of most minerals can be obtained through the proper choice of foods and beverages; however, many people do not consume a well-balanced diet, and mineral supplements can be beneficial to many. Among other uses, calcium supplements are beneficial for the building and protection of bones and teeth, for the prevention and possibly the treatment of osteoporosis, and for use as cofactors to a number of essential enzymes such as those involved in the conversion of prothrombin to thrombin. Additionally, increased amounts of calcium may be required after heavy physical exercise, and the level of calcium in the blood stream has been shown to have an effect on neurological function. Magnesium is an essential cofactor to many of the body's enzymatic reactions. Potassium is involved in basic cell metabolism and is used in high levels as a prescription for heart patients. Intake of potassium and magnesium has been found to reduce the risk of stroke. Zinc is also an essential mineral. Research is ongoing on the effects of specific minerals and mineral combinations on health.

Numerous attempts have been made to provide calcium nutritional supplements that are easily consumed by the public, are readily available, contain easily absorbable minerals, and have long storage times without degradation. To this end much of the work has focused on forms of calcium that can be added to drinks. For example, U.S. Pat. No. 5,500,232 to Keating claims a drink consisting essentially of citric acid, fumaric acid, calcium hydroxide and calcium glycerophosphate. But there is an "acid" flavor to all systems tested and this patent teaches to use this "tartness" as part of the flavoring system. U.S. Pat. No. 5,474,793 claims a method for making calcium supplemented fruit juice. However, these systems of calcium supplementation do not meet the requirements for a stable food supplement that can provide high amounts of soluble, bioavailable calcium and/or other minerals in a nontart form convenient for the user.

None of the prior art addresses the issue of multiple mineral supplements in high levels that provide for a highly soluble, stable product with little or no taste or odor and which is essentially clear when reconstituted in water.

BRIEF DESCRIPTION OF THE FIGURES

FIG. 4 shows SEMs (scanning electron micrographs) of some of the products of this invention.

SUMMARY OF THE INVENTION

Figure 1:
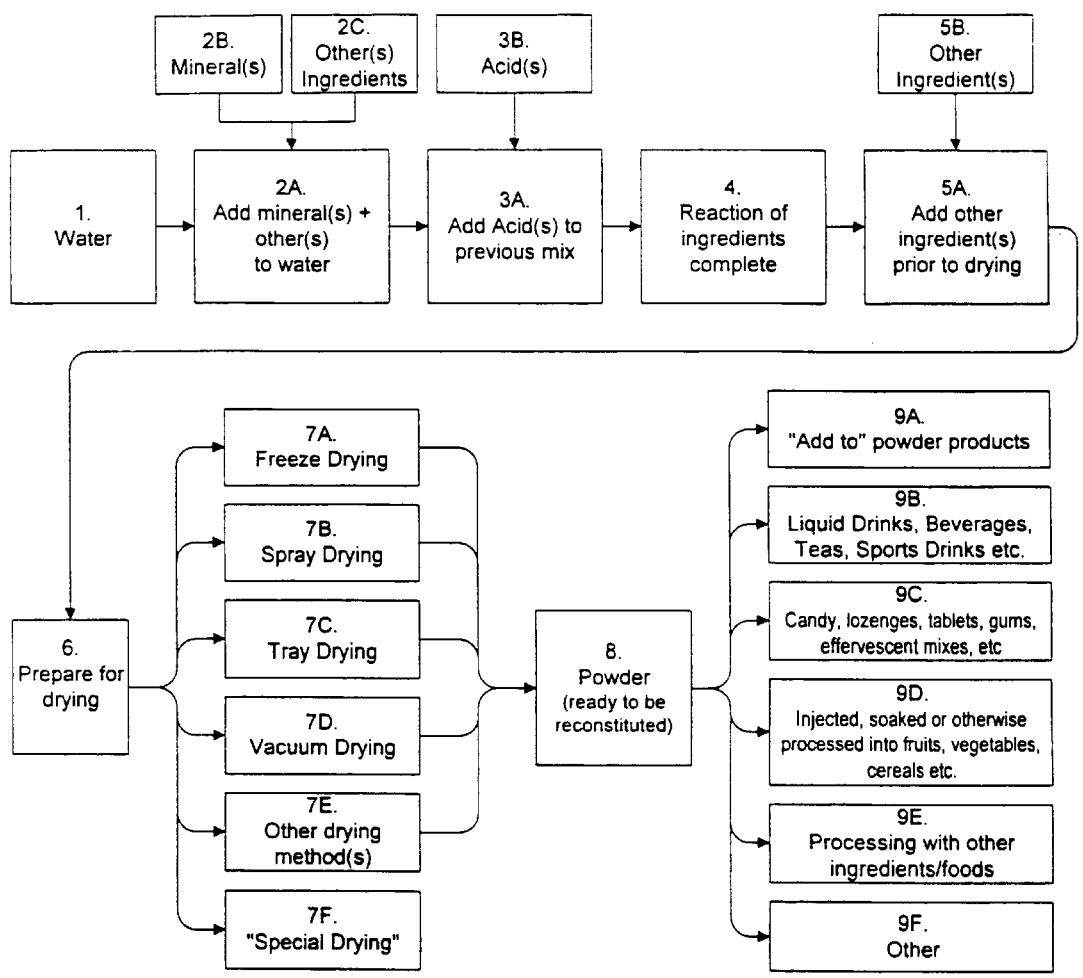
FIG. 1 is a flow chart of the procedures for preparing the compositions of the invention.

The present invention provides novel compositions containing calcium and/or other minerals (as single mineral compositions or as multiple mineral compositions), methods for making these compositions, and methods for delivering the compositions. The compositions provide soluble bioavailable calcium and/or other minerals at a high concentration due to the high solubility attained through the processing method contained in this patent. The compositions of the present invention are powders that can be reconstituted in aqueous solutions, are more stable and have improved clarity, odor, taste, smell and texture.

The term "elemental" as used herein means of or pertaining to the element referred to. The elements involved in this invention are primarily calcium, magnesium, potassium, zinc and other minerals required or beneficial for human consumption for nutritional purposes. Elemental percentage indicates the percentage of elemental calcium, magnesium, potassium, etc. present in a composition. Thus, if calcium lactate is in a composition, the elemental percentage of calcium does not include the percentage of lactate present.

The terms "high concentration" and "highly concentrated" and the like as used herein mean high levels of a particular individual or set of mineral(s) when reconstituted, as described below. For example, for elemental calcium, highly concentrated means at least around 333 mg/8 oz, preferably at least around 500 mg/8 oz, more preferably at least around 1,000 mg/8 oz, and also preferably at least around 2,000 mg/8 oz. For elemental magnesium, highly concentrated means at least around 100 mg/8 oz, preferably at least around 200 mg/8 oz, more preferably at least around 400 mg/8 oz, and also preferably at least around 800 mg/8 oz. For elemental potassium, highly concentrated means at least around 99 mg/8 oz, preferably at least around 500 mg/8 oz, more preferably at least around 1,000 mg/8 oz, and also preferably at least around 4,000 mg/8 oz.

Generally, for minerals such as calcium, magnesium, zinc and manganese that have Recommended Daily Intake levels (RDI's), a high concentration of the mineral is at least about 33% of the RDI per serving, preferably at least about 50% of the RDI per serving, more preferably at least about 100% per serving of the RDI, and also preferably at least about 200% of the RDI per serving. (Some minerals, such as potassium, don't have an RDI.)

The compositions of the present invention are soluble at high concentrations. The term "soluble" as used herein means capable of being dissolved, going into a liquid state from a solid state. The solubility of a mineral is an indicator of how bioavailable that mineral is. (See Schaafsma, G., "Bioavailability of calcium and magnesium," European Journal of Clinical Nutrition, 1977, "It is clear that availability for absorption requires calcium to be solubilized, either in free ionic or complexed form.") The rate of time or speed at which a composition solubilizes is especially important for "powder add-to liquid" consumer products since the consumer expects this to occur quickly.

Additionally, solubility plays a key role in formulating candies, gums, effervescent tablets, sachets, other powder products, and the like.

The compositions of the present invention reconstitute rapidly at high concentrations. The term "reconstitute" as used herein means the action of returning a mineral or set of minerals to a liquid state by the addition of the compositions of this invention to water or other liquid.

The compositions of the present invention also are very stable, allowing for a long shelf life of the compositions and of foods supplemented with the compositions. The term "stable" as used herein means capable of staying in solution without precipitating out of the solution or disassociating from other ingredients for a minimum of 3 months, more preferably at least 6 months, even more preferably 9 months and most preferably 12 months or more.

Additionally, these compositions, when reconstituted, have mild to no flavor, little or no odor, and in water are clear. The term "clear" as used herein means transparent, with very few or no particulates present. Thus the compositions can be added to liquid and solid foods, enhancing the nutrition of these foods while not negatively affecting their taste. This is especially true with liquid beverages such as water, teas, colas, and fruit or fruit flavored drinks, where the visual and sensory clarity of the product is vital. This processing also removes the offensive grittiness of existing mineral salts. This is also beneficial for lozenges, candies, gums and chewable and effervescent tablets.

The present invention can be used in nutritional amounts. The term "nutritional amount" as used herein refers to amounts of the mineral(s) of the compositions that provide the RDI (recommended daily intake) for the subject. This can mean that the compositions provide all of the RDI, or supplement other sources for the mineral(s). Additionally, nutritional amounts can be used to increase the subject's intake of the mineral(s) beyond the RDI to non-toxic levels.

Further, the present invention provides highly concentrated minerals that may optionally be used in pharmaceutical amounts for the treatment of particular diseases, such as potassium and magnesium for arterial and coronary diseases. (See Ascherio et al., "Intake of Potassium, Magnesium, Calcium, and Fiber and Risk of Stroke Among US Men," Circulation, 1998, 98:1198–1204.) The term "pharmaceutical amount" as used herein refers to a dose of the mineral(s) prescribed by a medical practitioner, and is generally many multiples of the RDI. Likewise, high doses of calcium are readily available through this invention for the prevention and treatment of osteoporosis. Further, pharmaceutical levels of minerals can be topically applied in the appropriate base, such as in the use of zinc in a cream to prevent or treat infection by rhinovirus.

The present invention provides novel methods for producing these mineral compositions, which methods provide the compositions with these desired characteristics.

DETAILED DESCRIPTION OF THE INVENTION

The mineral compositions of the present invention are powders comprised of minerals, such as calcium, that have been mixed in solution with an acid, completely solubilized at high concentrations, dried and ground. Powdered mineral salts are thus formed. These resulting powders are highly soluble when reconstituted in aqueous solutions.

Preparation

FIG. 1 is a flow chart that shows the general pathway for preparing the products of this invention. The powdered mineral salts are prepared as follows. This procedure is described, but not limited to, using calcium. A desired amount of calcium salt, such as calcium carbonate or calcium hydroxide, is first added to water (see FIG. 1, parts 1, 2A and 2B), preferably warm water at around 70–74° F. Also useful for this step are other dilute aqueous solutions that contain heat stable compounds such as fructose desired to be present in the final product. (See FIG. 1, part 2C). Other temperatures can be used. The water needs to be at a temperature that will allow for an even distribution of the mineral(s) (FIG. 1, part 2B) and any other ingredients that will be added at this point (FIG. 1, part 2C). Also, the temperature of the water at this point needs to take into consideration the next step (FIG. 1, parts 3A and 3B). The mineral is preferably in powder form to speed solubilization. The solution is mixed until all of the mineral powder is wet and evenly distributed within the aqueous solution.

Next the chosen acid is added (FIG. 1, parts 3A and 3B). Preferably this is done slowly while continuing to mix the solution so that the minerals and any other ingredients are evenly distributed in the aqueous solution. Foaming is monitored, and mixing speed as well as rate of acid addition can be decreased to prevent foaming. At this step, manufacturing is easier if the solution is not boiling. However, if boiling is required to allow the minerals to react and go into solution, the whole mixture can be brought to a boil after the initial reaction of the acid(s) and mineral(s) has taken place.

The acid used combines with the minerals to form a salt, so acids that result in bioavailable mineral salts are preferred. Examples of acids that can be used are lactic acid, acetic acid, citric acid, malic acid, phosphoric acid, ascorbic acid, and/or any food grade acid that will solubilize the mineral or mineral mix or combinations thereof. The amount of acid to add to the minerals is that which will cause the final dry composition to reconstitute in water and become clear, relatively odorless and relatively taste-free. If the flavor of the reconstituted powder is too acidic, then the amount of acid is decreased. If the reconstituted powder is not clear/transparent, then the amount of acid is increased. The amount of acid used is usually about two to three times the weight of the mineral component. This amount of acid used will vary based on the acid(s) being used and the mineral(s) and mineral forms being used.

As the acid is added, an exothermic reaction takes place, raising the temperature of the mixing solution. The temperature can also be raised by application of external heat. The preferred temperature is at least around 130° F., such as around 140° F. or 150° F., preferably around 160° F., also preferably around 190° F., more preferably around 180° F., most preferably around 170° F., although temperatures higher than 190° F. are also useful. The temperature is chosen that allows the solution to become translucent by the solubilization of all of the minerals and acids.

When the solubilization (FIG. 1, part 4) is complete, the composition is ready to be dried (FIG. 1, part 6). Different drying systems require specific conditions. Examples of drying systems include, but are not limited to, freeze drying, spray drying, tray drying, and vacuum drying.

Spray drying requires that the solution be maintained at a temperature that keeps the solution in a liquid state while it is being run through the dryer. If the temperature is too low, the solution will start to solidify. In spray drying, a temperature of at least 140° F. is sufficient, but 170° F. is superior. One element to consider in determining the temperature of the solution at the beginning of the spray drying stage is how the pipes running from the storage tank to the spray dryer will affect the temperature of the solution. If along this route the solution is allowed to cool so that it begins to solidify, the pipes will clog. Hence, time of year, temperature of the facility, altitude and other environmental factors all go into setting the correct temperature for the material waiting to be run through the spray dryer.

For freeze drying, the material can be allowed to cool down to a point where it is easy to handle to put on freeze drying trays. In one version of freeze drying, the trays with the solution are held on carts until the material starts to solidify or get firm enough so that the carts holding the trays can be moved into a cold room for freezing without spilling any material out of the trays. For example, a calcium/magnesium/lactate solution having 50% dissolved solids starts to show signs of solidifying at around 120° F. Pouring this formula on a tray from a storage tank where the solution is held at 140° F., it takes approximately 45 minutes for the material to solidify to the point where it is easy to handle. Environmental factors, such as heat and moisture and air temperature can affect this time. A variation of this is to put the trays on the carts and the carts inside the freezing room. A hose can be run from the mixing tank to the carts and the material pumped onto the trays. Once the material on the tray reaches a temperature that is acceptable to the freeze drying facility, then the trays are put into the freeze dryer and standard freeze drying technology is used to dry the material.

For tray drying, a similar approach is used as that of freeze drying. However, once the solution has partially solidified, the material is broken up and put on tray drying trays. Examples of such trays have bottoms that are an open mesh to allow the air to blow through the top and the bottom.

Other methods for drying are well known in the industry. Some methods of drying work better than. others for different formulas. However, determination of which is the best drying method is an uncomplicated process.

Freeze drying creates a light and easily dissolved powder that can be reconstituted in cold or hot aqueous solvent. Spray drying results in a product that has different physical properties such as weight, density, and flow characteristics, than the freeze dried product. This product also has different dissolving times than the freeze dried product, but is as stable in solution as the freeze dried product once it is reconstituted. Tray drying produces an even denser product that has different physical properties such as weight, density, and flow characteristics from the freeze dried and spray dried products. This product has different dissolving times than the freeze dried and spray dried products but is as stable in solution.

Other ingredients can be added to the solution during the steps preceding drying (FIG. 1, parts 5A and 5B). Upon reaction of the mineral(s) with the acid(s) (and any other ingredient already present) the temperature of the mixture rises due to the exothermic reaction, and may be further increased as described above. At this point, or as the mixture cools, (FIG. 1, parts 5A and 5B) other ingredients may be added. The heat stability of the ingredient(s) to be added is a determining factor in deciding at which temperature they are added to the solution. Those ingredients that can be added at this step (FIG. 1, parts 5A and 5B), as well as in subsequent steps, include, but are not limited to sweeteners such as sucralose (McNeil Specialty Products Company), acesulfame K, sucrose, fructose, corn syrup, maple syrup and honey, flavored syrups such as soft drink syrups, fruit flavored syrups and nut flavored syrups, fruit and vegetable extracts or juices, herbs such as Echinacea, goldenseal, and St. John's Wort, cofactors, and teas, tea flavors or extracts such as chamomile, peppermint, spearmint, black tea and green tea, proteinaceous substances such as non-enzymatic proteins, enzymes, amino acids and peptides, cofactors, natural flavors, artificial flavors, functional agents that can change the characteristic of the composition or its reconstituted form such as guar gum, agar, pectin and the like, flow agents like silica, preservatives such as sodium or potassium benzoate, colors either from natural or synthetic sources, and combinations thereof. An example of a combination useful in this invention is a flavor system comprising a flavor, color, a sweetener, and optionally an acid (for flavor).

In the case of spray drying where the temperature at FIG. 1 Steps 5 & 6 needs to be maintained at least at 140° F. and more preferably at 170° F. as covered above, ingredients that would react negatively to that temperature should not be used.

The products of this process are very stable and highly soluble in water or other aqueous media (FIG. 1, Step 8). Examples of useful vehicles include, but are not limited to, both plain and carbonated water, flavored sodas, animal milk, yogurt, cheese, cottage cheese, soy milk, rice milk, artificial milk and cream substitutes, coffee, fruit juices and drinks, vegetable juices and drinks, sports drinks, teas, powdered and reconstituted shakes and other beverages. The products can also be added to foods such as gelatins, puddings, mayonnaise, ice creams, soup mixes, and other condiments, salad dressings, fruit spreads and nut butters.

Because the products of this invention are soluble at high concentrations and have stability, these compositions can also be added to topical preparations such as creams, shampoos and toothpaste.

Additional ingredients that can be added to the products include, but are not limited to, natural sweeteners such as sucrose, fructose and corn syrup, artificial sweeteners such as, saccharin and sucralose, other flavorings (and their various components), powdered drinks, cold and hot cereals, enzymes, amino acids and peptides, together with or without acceptable preservatives.

The products can also be injected into fruits, vegetables and other foods that are to be freeze dried or tray dried, such as corn, strawberries, raspberries, grapes, apricots, plums, cranberries, blueberries, meats, noodles, etc. The products can also be coated onto these foods after they are dried.

The products can additionally be used as ingredients for bread, cereals, bake mixes, mixed with flours and other baked products. Alternately, cereal grains or cereal particles may be soaked in the liquid mineral mix at step 5, step 7F, or at step 9, until the minerals are absorbed, and then dried to remove the water and processed into their cereal state. Once the cereal is fully processed, the minerals in the product will remain in or on the cereal.

Packaging

The products of this process can be supplied in the form achieved upon drying. Spray drying, for example, creates an instant powder. However freeze drying, tray drying and vacuum drying require grinding once the product is dried if a powder form is desired. These powders can be packaged as industrial ingredients and shipped from the drying facility to other manufacturing plants for further processing into products.

Additionally, the products can be used as a loose powder to make tablets, capsules, lozenges, candies, gums, liquids and the like. They can also be used as an ingredient on their own or as an ingredient that is packaged and/or used in formulas with other nutritional supplements such as vitamins and other minerals. When appropriate, excipients and binders may be present.

Some of the products of this process can be packaged in single serving sachets, with or without flavorings and/or other ingredients. Each sachet may contain, for example, 33% of the RDI for calcium, 33% of the RDI for both calcium and magnesium, 50% of the RDI for magnesium, or 6 grams potassium, a pharmaceutical level of potassium.

Ingredients

1. Minerals

The term "nutritional minerals" as used herein refers to minerals that are beneficial when taken internally. Calcium can be formulated alone or combined with other nutritional minerals to make multi-mineral products. Other useful minerals include, but are not limited to, magnesium, potassium and zinc. Additionally, single mineral formulas and combinations of these minerals can be made without calcium. In the process of this invention, adding a second, third or fourth type of nutritional mineral can increase the solubility and stability of calcium in the solution while still maintaining the improved sensory qualities such as taste, smell, texture and clarity. Thus, it is preferred to make a product comprising more than one nutritional mineral. Table 1 shows the solubility and stability of various FORMULA EXAMPLES of this patent in solution at high concentrations. Other minerals can be added at nutritional or higher levels or as trace minerals. These can be added at FIG. 1, Step 2B.

2. Acids

Acids can be used alone or in combination. Acids are selected from food grade acids, such as those present on the GRAS list provided by the FDA, such as, but not limited to, lactic acid, malic acid, acetic acid, phosphoric acid, citric acid and ascorbic acid. Lactic acid is a preferred acid. Acetic acid can be used alone or can be added with another acid such as lactic acid to increase solubility of the minerals. Acetic acid when used solely or as a large percent of the acid component adds a slight vinegar flavor to the product, so products made with acetic acid alone are best combined with foods containing vinegar.

As noted above, ascorbic acid can be used in the present invention. Since ascorbic acid is Vitamin C, the resulting product will have added nutritional content.

Citric and phosphoric acids are also effective for making the products of this invention. Factors considered in deciding which acid to use include cost of the acid, elemental yield of minerals (amount of solids of the acid that end up in the final composition), and time taken and methods available to dry the solution into a powder. For example, formulas that use solely or predominantly phosphoric acid and ascorbic acid as the acid source dry better, and in a reasonable amount of time, with freeze drying than with other drying methods.

3. pH

The pH of the reconstituted product (FIG. 1, parts 7F and 9A–F) is preferably low enough to inhibit or prevent bacterial growth. Thus, after determining the amount of acid to be added to the mineral(s) to allow solubilization and the mineral/acid reaction to occur in the initial mixing step (FIG. 1, steps 3A and 3B), additional acid can be added to result in a lower pH of the reconstituted product, as needed. Alternatively, additional acid can be added just prior to drying (See FIG. 1, part 5B). However, the taste of the final product will reflect this addition. For example, citric acid, malic acid and phosphoric acid are commonly introduced to beverages to lower the pH. The pH range for beverages is normally 4.5 to 2.5. preferably 3.75, more preferably about 3.4 or less.

4. Methods of Mixing

To mix the minerals in the aqueous solvent (FIG. 1, parts 2A–C), it is preferred to blend the components together. However, stirring without blending is acceptable for most formulas. Additionally, it is preferred to add the minerals to the solvent prior to adding the acid(s). It is important that the mineral(s) and any other(s) ingredients be kept in solution, not clumped or collecting at the bottom of the container.

5. Methods of Drying and Producing Powder

As described above, any standard method of drying the solution into a powder is acceptable. Freeze drying is preferred for certain applications. The method of drying affects the form of the resulting particles. With spray drying, no grinding is necessary. With freeze or tray drying, the dried product is in the form of cracked chalk, which is then ground/milled to produce a powder. The final particle size after grinding/milling affects the rate of reconstitution. This is important in consumer "powder add to water" products where fast reconstitution is desired. An exception to this grinding/milling is the earlier example of making a complete candy/confection and shown as FIG. 1, part 7F. In this case, the final form of the material after drying is the final product form.

6. Storage

The products of this invention can be stored stably in dried, powder form, or they can be stored stably reconstituted in an aqueous solution. In fact, the products of this invention are appreciably more stable than the prior art. Table 1, below, shows the stability of reconstituted products of this invention.

Solubility and Stability

The products of this invention are highly soluble and very stable—much more so than the prior art. Also, this solubility and stability occurs at high concentrations. Table 1 shows that a composition of this invention completely solubilized at 4,000 mg. calcium and 1,600 mg magnesium (Table 1, line 13) in 8 ounces of water. Also, 800 mg of magnesium and a mixture of 2,000 mg calcium, 800 mg. magnesium, 188 mg potassium and 28 mg zinc (Table 1, line 20) solubilizes in 8 ounces of water.

Table 1 more importantly shows the stability of the compositions of this invention at high concentrations. The table shows various levels of calcium and calcium/magnesium. The calcium and magnesium samples stay in solution and are more stable, than their calcium counterparts. For example, 1,000 mg calcium and 400 mg magnesium (Table 1, line 9 and 10) are still in solution after 202 days. Calcium alone (Table 1, lines 1 and 2) at 1,000 mg fell out of solution after 19 days.

In addition, Table 1 shows that a calcium magnesium composition of this invention with an added flavor system (Table 1, line 16) is still in solution after 198 days; these minerals dissolve and are stable in sports drinks such as Gatorade®, PowerAde® and AllSport® at the high concentrations of at least 500 mg calcium and 200 mg magnesium per 8 ounces of each of these drinks (Table 1, lines 26, 27 and 28).

Further, Table 1 shows that a calcium/magnesium composition of this invention has remained dissolved in Welch's 100% grape juice for 198 days, demonstrating the stability of the composition (Table I, line 29). Compositions of calcium alone were tried and they failed. The calcium fell out of solution within a short time.

It is completely unexpected that calcium and magnesium together make a more stable composition than calcium alone. The addition of other minerals to calcium, such as zinc, magnesium, and magnesium plus potassium and zinc, appears to enhance the stability and solubility of calcium.

TABLE 1

Elemental Mineral amounts are per 8 oz. water

| # | Formula Example | Mixed with | Ca mg | Mg mg | K mg | Zn mg | pH | Still in Solution | Days |
|---|---|---|---|---|---|---|---|---|---|
| 1 | B | water | 1,000 | | | | 3.4 | No | 19 |
| 2 | B | water | 1,000 | | | | 2.8 | No | 19 |
| 3 | B | water | 500 | | | | 3.4 | yes | 202 |
| 4 | B | water | 500 | | | | 2.8 | yes | 202 |
| 5 | B | water | 333 | | | | 3.4 | yes | 202 |
| 6 | B | water | 333 | | | | 2.9 | yes | 202 |
| 7 | A1 | water | 2,000 | 800 | | | 3.4 | no | 40 |
| 8 | A1 | water | 2,000 | 800 | | | 2.8 | no | 40 |
| 9 | A1 | water | 1,000 | 400 | | | 3.4 | yes | 202 |
| 10 | A1 | water | 1,000 | 400 | | | 2.8 | yes | 202 |
| 11 | A1 | water | 500 | 200 | | | 3.4 | yes | 202 |
| 12 | A1 | water | 500 | 200 | | | 2.8 | yes | 202 |
| 13 | A1 | water | 4,000 | 1600 | | | 3.75 | no | 5 |
| 14 | A1 | water | 1,000 | 400 | | | 3.75 | yes | 181 |
| 15 | A1 | water | 500 | 200 | | | 3.75 | yes | 181 |
| 16 | O | water | 500 | 250 | | | 3.4 | yes | 198 |
| 17 | L | water | 2,000 | | | 30 | 3.75 | yes | 22 |
| 18 | L | water | 1,000 | | | 15 | 3.75 | yes | 22 |
| 19 | L | water | 500 | | | 7.5 | 3.75 | yes | 22 |
| 20 | M | water | 2,000 | 800 | 188 | 28 | 3.75 | yes | 22 |
| 21 | M | water | 1,000 | 400 | 94 | 14 | 3.75 | yes | 22 |
| 22 | M | water | 500 | 200 | 47 | 7 | 3.75 | yes | 22 |
| 23 | G | water | 800 | | | | 3.75 | yes | 22 |
| 24 | G | water | 400 | | | | 3.75 | yes | 22 |
| 25 | G | water | 200 | | | | 3.75 | yes | 22 |
| 26 | A1 | Gatorade | 500 | 200 | | | 4.08 | yes | 181 |
| 27 | A1 | PowerAde | 500 | 200 | | | 4.09 | yes | 181 |
| 28 | A1 | AllSport | 500 | 200 | | | 4.15 | yes | 181 |
| 29 | F | Welch's Grape Juice | 250 | 100 | | | 2.95 | yes | 198 |

Note for all samples:
1. All samples have been stored at 40–45° F.
2. Note for all samples except 26–29:
   a. Potassium Benzoate was added at the rate of 0.1% of total wt.
   b. Citric Acid was added to adjust to the target pH.

Table 2 shows the solubilization rates for compositions of this invention and similar commercial products. All samples were the equivalent of 3.4 g calcium in 8 ounces of deionized water at 68° F. The % of maximum solubility was measured at complete dissolution or at 7 minutes, whichever came first.

Figure 2:
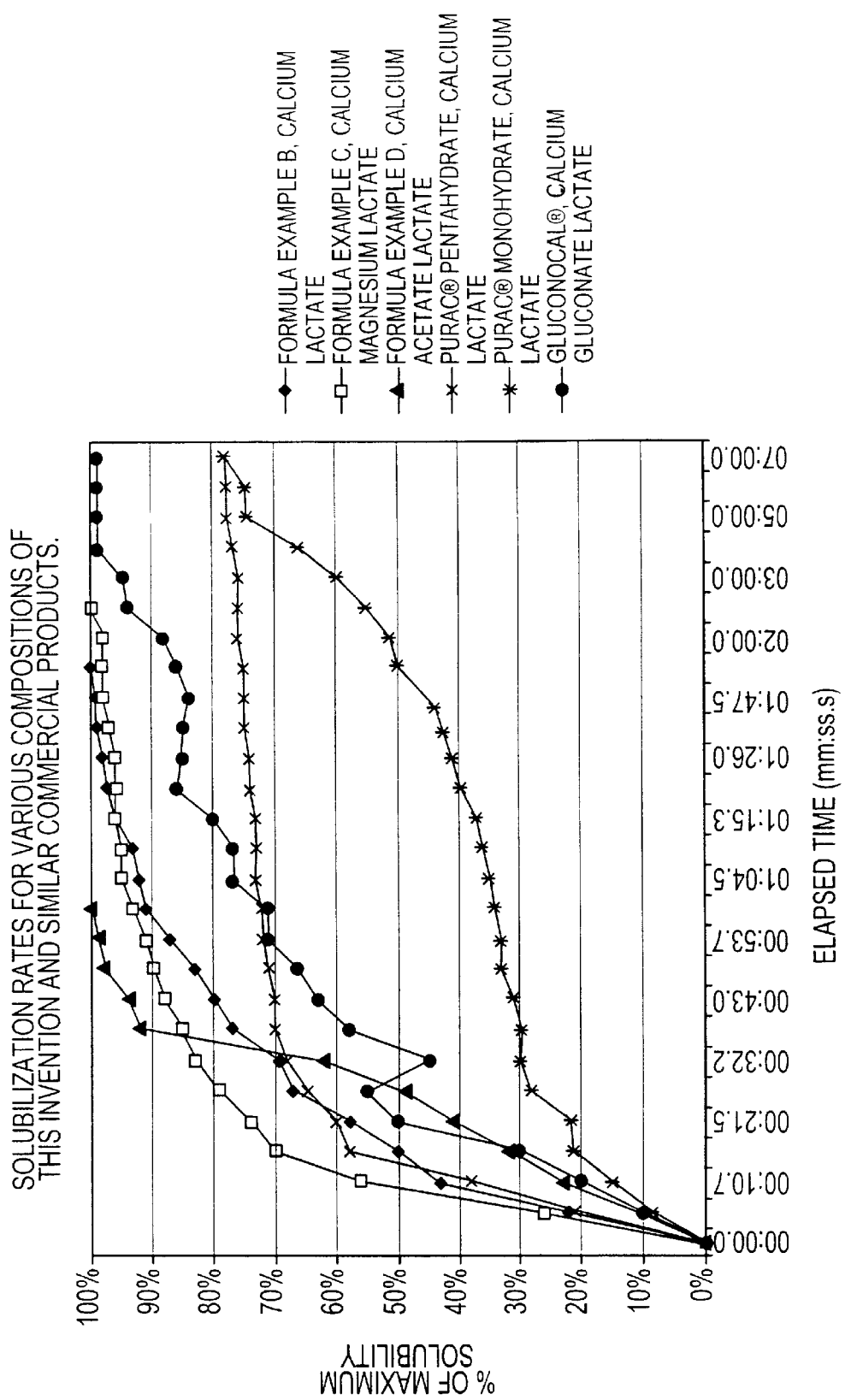
FIG. 2 is a graph of the results of Table 1, showing solubilization rates of products of this invention compared to prior art products.

Table 2 and the graph of FIG. 2 show the speed of reconstitution at equivalent elemental concentrations of calcium for three of the products of this invention as compared to three products of the prior art. Formula Example B (calcium lactate) ♦, Formula Example C (calcium magnesium lactate) □, and Formula Example D (calcium acetate lactate) ▲ were studied against the prior art Pura® Monohydrate (calcium lactate) *, Purac® Pentahydrate (calcium lactate) X and Gluconocal© (calcium gluconate lactate) ●. Solubility was significantly higher with the products of this invention than each of the three prior art products. FIG. 2 shows this graphically. It is noted that 400 mg of freeze dried Formula B can be reconstituted in 8 oz. of water in 3 min.—a rate much faster for such a large amount of elemental calcium than possible with the prior art.

TABLE 2

Dissolution Rates as % of Maximum Solubility

| Elapsed Time [mm:ss.s] | Formula Example B Calcium Lactate | Formula Example C Calcium Magnesium Lactate | Formula Example D Calcium Acetate Lactate | Purac ® Pentahydrate Calcium Lactate | Purac ® Monohydrate Calcium Lactate | Gluconal ® Calcium Gluconate Lactate |
|---|---|---|---|---|---|---|
| 00:00.0 | 0% | 0% | 0% | 0% | 0% | 0% |
| 00:05.4 | 22% | 26% | 9% | 21% | 9% | 10% |
| 00:10.7 | 43% | 56% | 23% | 38% | 15% | 20% |
| 00:16.1 | 50% | 70% | 32% | 58% | 21% | 30% |
| 00:21.5 | 58% | 74% | 41% | 60% | 22% | 50% |
| 00:26.9 | 67% | 79% | 49% | 65% | 28% | 55% |
| 00:32.2 | 69% | 83% | 62% | 68% | 29% | 45% |
| 00:37.6 | 77% | 85% | 92% | 70% | 29% | 58% |
| 00:43.0 | 80% | 88% | 94% | 70% | 31% | 63% |
| 00:48.4 | 83% | 90% | 98% | 71% | 33% | 66% |

TABLE 2-continued

Dissolution Rates as % of Maximum Solubility

| Elapsed Time [mm:ss.s] | Formula Example B Calcium Lactate | Formula Example C Calcium Magnesium Lactate | Formula Example D Calcium Acetate Lactate | Purac ® Penta-hydrate Calcium Lactate | Purac ® Mono-hydrate Calcium Lactate | Gluconal ® Calcium Gluconate Lactate |
|---|---|---|---|---|---|---|
| 00:53.7 | 87% | 91% | 99% | 72% | 33% | 71% |
| 00:59.1 | 91% | 93% | 100% | 72% | 34% | 71% |
| 01:04.5 | 92% | 95% | | 73% | 35% | 77% |
| 01:09.9 | 93% | 95% | | 73% | 36% | 77% |
| 01:15.3 | 96% | 96% | | 73% | 37% | 80% |
| 01:20.6 | 97% | 96% | | 74% | 40% | 83% |
| 101:26.0 | 98% | 96% | | 74% | 41% | 86% |
| 01:36.7 | 99% | 97% | | 75% | 43% | 85% |
| 01:47.5 | 99% | 98% | | 75% | 45% | 85% |
| 01:58.2 | 100% | 98% | | 75% | 50% | 86% |
| 02:09.0 | | 98% | | 76% | 51% | 88% |
| 03:30.5 | | 100% | | 76% | 55% | 94% |
| 03:00.0 | | | | 76% | 60% | 98% |
| 04:00.0 | | | | 77% | 67% | 99% |
| 05:00.0 | | | | 78% | 75% | 99% |
| 06:00.0 | | | | 78% | 75% | 99% |
| 07:00.0 | | | | 78%* | 79%** | 99%*** |

*After 1 hour, 31 minutes-80%
**After 59 minutes-85.2%
***After 8 minutes, 41 seconds-100%

Table 3 shows reconstitution times of calcium/magnesium lactate products mixed as described herein. These minerals were used in the ratio of calcium: magnesium of 5:2. The RDI for calcium is 1000 mg, while the RDI for magnesium is 400 mg. The starting formula for one of the products contained 30% solids at the 5:2 ratio dissolved in water (A1), while the other formula began with 50% solids at the 5:2 ratio (A2). Even though the procedures start out with different quantities of minerals, albeit in the same ratios, the concentrations of the minerals in the final powder product are the same in A1 and A2. These concentrations are 100 mg calcium/gm product and 40 mg magnesium/gm product.

The first two samples were freeze dried, the third sample was spray dried and the fourth sample was tray dried. The table shows time for reconstitution of the dried powders, producing calcium and magnesium concentrations in water at various percentages of the RDI for these minerals: 25% (2.5 grams of the product), 33% (3.3 grams of the product), 50% (5 grams of the product), 100% (10 grams of the product), 200% (20 grams of the product), 300% (30 grams of the product) and 400% (40 grams of the product). In all cases the time for reconstitution of the powder products was calculated from the time the powder was put into the beaker (400 ml Pyrex, filled to 8 oz) until the water was clear and at least 95% of the powder was in solution. In the event that 5% was not dissolved during the first measured period of time, such as with some of the high concentration tray dried or freeze dried formulas, this remaining 5% dissolved within the next few minutes without any additional stirring. In each case tap water was used for reconstitution. The magnetic stirrer (Barnstead Thermolyne Model #S46415) was set to "8". Occasionally, a spoon was used to assist the solubilization of the powder.

The reconstitution times vary with the temperature of the water and the concentration of the minerals. With large quantities of powder it took longer for the material to be added to the beaker than with smaller quantities. Temperatures at which reconstitution times were tested were 190–195° F., 130–140° F., 70–75° F. (ambient temperature) and 40–45° F. Times on the table are presented in minutes-:seconds format.

TABLE 3

| Formula and Drying Method | Min:Sec to Reconstitute in Water at Noted Temperatures | | | |
|---|---|---|---|---|
| | 190–195° F. | 130–140° F. | 70–75° F. | 40–45° F. |
| 2.50 grams of powder (25% RDI) reconstituted in water | | | | |
| A1 freeze dried | 00:06 | 00:13 | 00:21 | 00:33 |
| A2 freeze dried | 00:08 | 00:25 | 00:50 | 01:00 |
| A2 spray dried | 00:06 | 00:15 | 00:28 | 00:58 |
| A2 tray dried | 00:05 | 00:25 | 01:20 | 03:16 |
| 3.33 grams of powder (33% RDI) reconstituted in water | | | | |
| A1 freeze dried | 00:06 | 00:30 | 00:45 | 01:10 |
| A2 freeze dried | 00:12 | 00:34 | 01:05 | 01:16 |
| A2 spray dried | 00:07 | 00:22 | 00:31 | 01:30 |
| A2 tray dried | 00:05 | 00:30 | 01:30 | 04:54 |
| 5.00 grams of powder (50% RDI) reconstituted in water | | | | |
| A1 freeze dried | 00:08 | 00:25 | 00:35 | 01:22 |
| A2 freeze dried | 00:08 | 00:20 | 01:10 | 01:50 |
| A2 spray dried | 00:05 | 00:22 | 00:36 | 00:56 |
| A2 tray dried | 00:05 | 00:30 | 01:33 | 05:54 |
| 10.00 grams of powder (100% RDI) reconstituted in water | | | | |
| A1 freeze dried | 00:08 | 00:30 | 01:00 | 03:17 |
| A2 freeze dried | 00:12 | 00:50 | 02:50 | 04:20 |
| A2 spray dried | 00:08 | 00:20 | 00:36 | 01:39 |
| A2 tray dried | 00:07 | 00:40 | 02:50 | 11:25 |
| 20.00 grams of powder (200% RDI) reconstituted in water | | | | |
| A1 freeze dried | 00:22 | 00:50 | 01:00 | 06:10 |
| A2 freeze dried | 00:26 | 01:50 | 03:00 | * |
| A2 spray dried | 00:10 | 00:30 | 03:55 | 04:23 |
| A2 tray dried | 00:13 | 00:58 | 03:45 | 12:48 |
| *Not totally soluble | | | | |
| 30.00 grams of powder (300% RDI) reconstituted in water | | | | |
| A1 freeze dried | 00:21 | ** | ** | ** |
| A2 freeze dried | 00:20 | ** | ** | ** |

TABLE 3-continued

| Formula and Drying Method | Min:Sec to Reconstitute in Water at Noted Temperatures | | | |
|---|---|---|---|---|
| | 190–195° F. | 130–140° F. | 70–75° F. | 40–45° F. |
| A2 spray dried | 00:21 | ** | ** | ** |
| A2 tray dried | 00:21 | ** | ** | ** |
| **Not tested | | | | |
| 40.00 grams of powder (400% RDI) reconstituted in water | | | | |
| A1 freeze dried | 00:30 | ** | ** | ** |
| A2 freeze dried | 00:32 | ** | ** | ** |
| A2 spray dried | 00:35 | ** | ** | ** |
| A2 tray dried | 00:30 | ** | ** | ** |
| **Not tested | | | | |

It is clear when Table 1, Table 2 and Table 3 are viewed together that the products of this invention are highly soluble and highly stable at high concentrations. It is also clear that the calcium/magnesium, calcium/zinc and calcium/magnesium/potassium/zinc products of this invention are more highly soluble and more stable than a calcium product alone.

Sensory

The products of this invention, both powder and reconstituted, have an improved taste, smell and texture over the starting ingredients prior to any processing. This is an unexpected result. The sensory properties of the solution of Step 4 (FIG. 1) are improved over those of Step 1, and the sensory properties upon reconstitution in Steps 7F and 9 are further improved over those of Step 4. This has been found regardless of the particular method of drying.

Physical Characteristics a) Amorphous Structure

When a solid compound is formed from solution by slowly evaporating its water, the atoms of the compound arrange themselves into an ordered crystal structure, forming strong bonds among the solid's cations and anions. However, when a solid forms rapidly, the atoms of the compound are unable to form an ordered crystal structure, and the bonds among the solid's ions are weaker. This non-crystalline solid is also known as an amorphous solid.

Figure 3A:
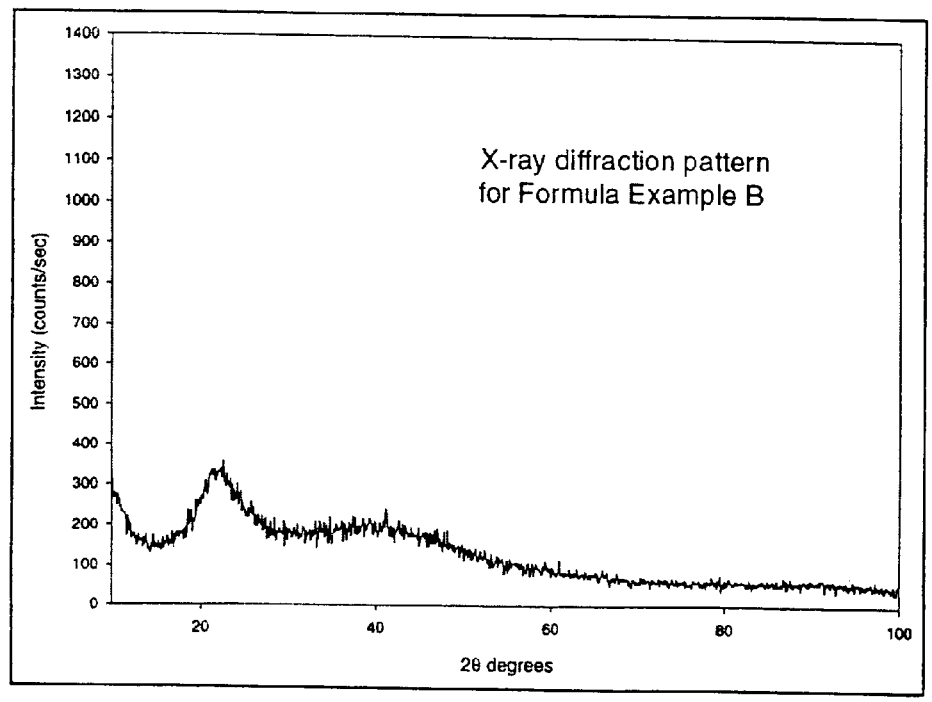
FIG. 3A shows the pattern for formula B, FIG. 3B for formula C, and FIG. 3C for formula D.
Figure 3B:
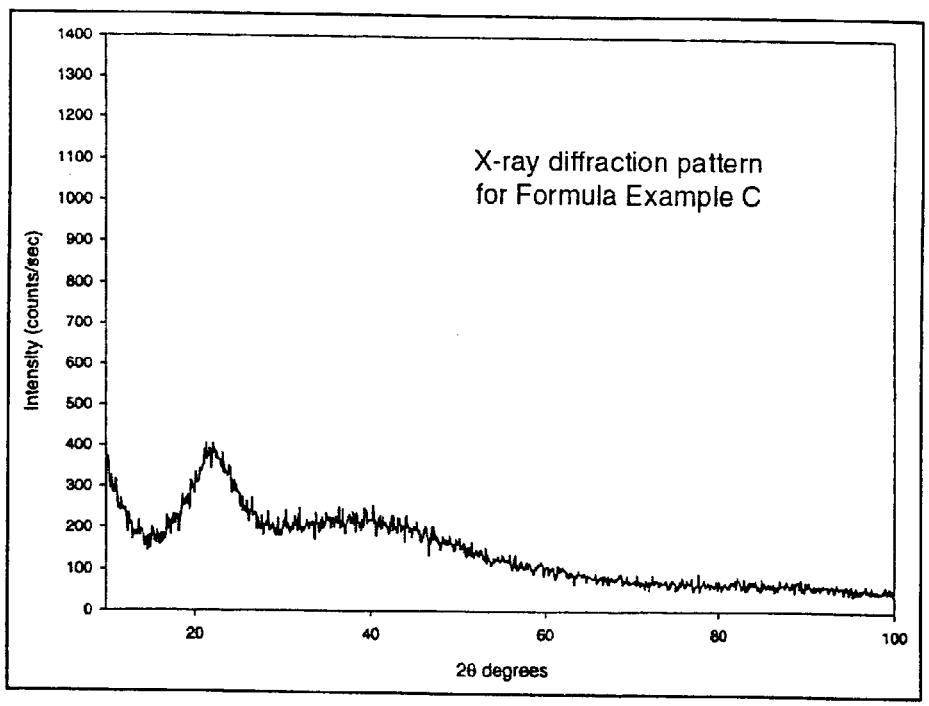
FIG. 3 shows x-ray diffraction patterns for some of the products of this invention.
Figure 3C:
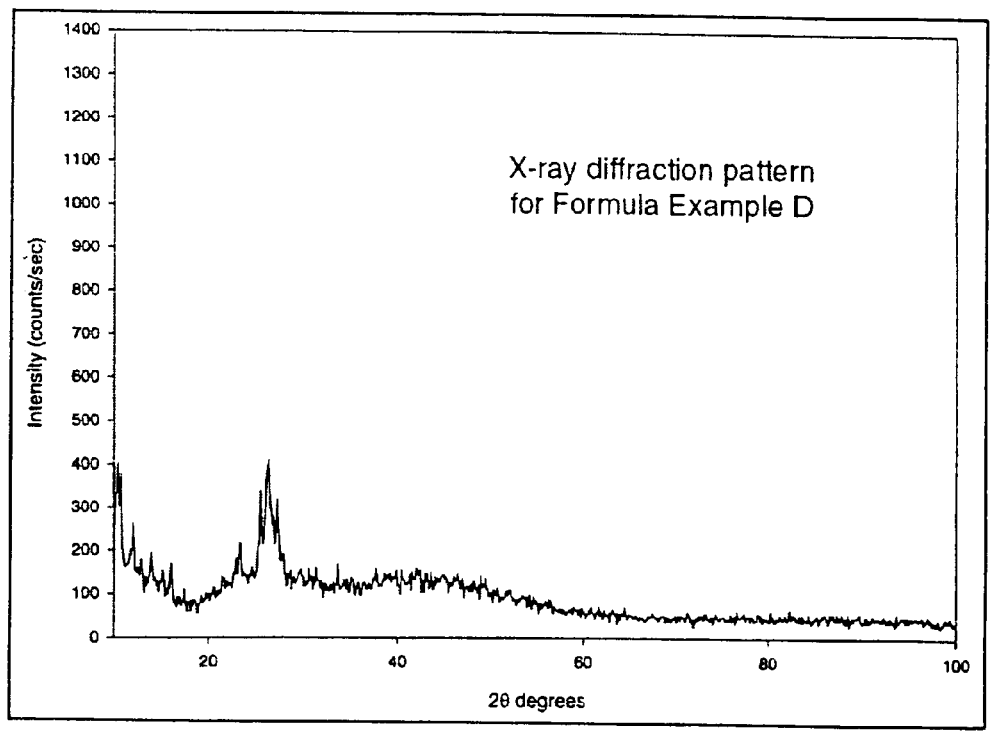
Figure 4A:
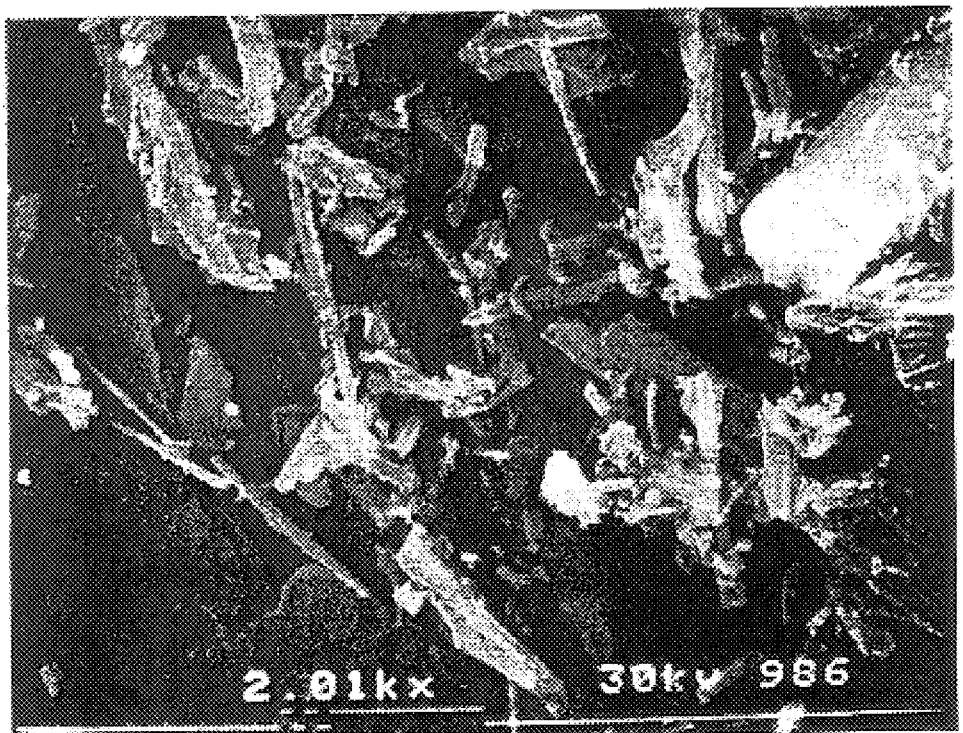
FIG. 4A is an SEM of the product of formula B.
Figure 4B:
FIG. 4B is an SEM of the product of formula C.
Figure 4C:
FIGS. 4C and 4D are SEMs of the product of formula D.
Figure 4D:
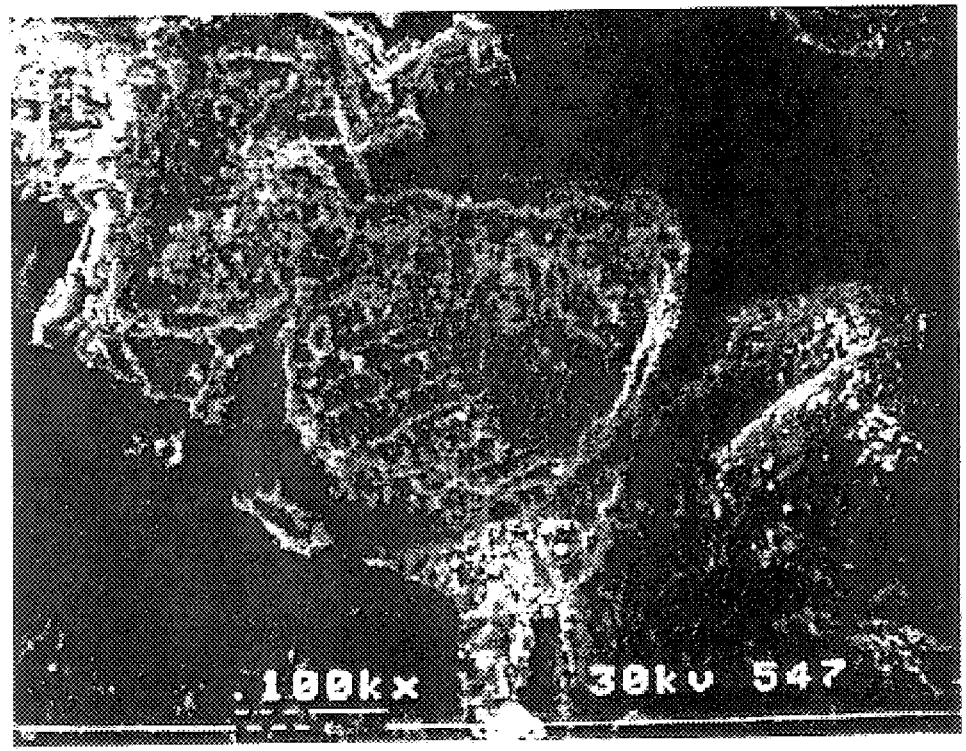

In the present invention, a regular crystal structure does not exist. Instead, the product is an amorphous solid. FIG. 3 shows X-ray diffraction patterns for some of the compounds of this invention. These indicate that the present compounds are less crystalline (i.e., more amorphous) than the compounds in the prior art. FIG. 4 shows SEM pictures of some of the products, in which the amorphous structure can be seen.

The product is apparently a sequestrant, i.e., the result of sequestration, which allows high concentrations to be solubilized without precipitating out of solution. "Sequestration" can be defined as the combining of metallic ions with a suitable reagent into a stable, soluble complex in order to prevent the ions from combining with a substance with which they would otherwise have formed an insoluble precipitate, from causing interference in a particular reaction, or from acting as undesirable catalysts.

b) Lower Water Content

For compounds to dissolve in water, the bonds between the cations (e.g., calcium) and the anions (e.g., lactate) must be broken. Energy is required, in the form of heat, to break these bonds. However, once these bonds are broken, consuming heat, new bonds form between the water and the dissolved ions, thus releasing some energy, also in the form of heat. More energy is produced than is consumed in the reaction. This released energy is called the heat of hydration.

The compositions of this invention have a lower water content than those of the prior art. This allows the compounds to release more heat when dissolving in water, which speeds up the solubilization of the dry compositions. It also allows more minerals to go into solution.

c) Higher Free-acid Content

The compositions of this invention have higher levels of free acid than those of the prior art. For example, when the acid used is lactic acid and the mineral is calcium, the lactate molecule in the supplements may be present as either a salt (e.g., calcium lactate) or a free acid (e.g., lactic acid). The more acid present in the solid, the lower the pH of the solution that forms when that solid dissolves in water. Furthermore, because calcium lactate is more soluble at lower pH values, it dissolves more quickly when there is excess free acid in the formulation. The compositions of this invention contain excess free acid, making the pH of the solutions prepared from the compositions lower than that of solutions of the prior art. This lower pH contributes to the faster solubilization rate of the compounds of the invention.

d) Particle Size and Surface Area

The smaller the particle size of a given dose of supplement, the higher is its surface area. Higher surface area means that more of the supplement will contact the water into which it is being dissolved, and it will dissolve faster. However, with respect to the compositions of this invention, the size of the particles was in the same range as those of the prior art. Therefore, surface area probably does not have an effect on the greater solubility of these compounds.

EXAMPLES

Except where Noted, Percentages are Weight/Weight.

Example 1

A calcium-magnesium product was made as follows.
Ingredients
  536.34 g water
  209.68 g lactic acid 88% (ADM)
  39.52 g calcium hydroxide (Mallinckrodt)
  14.16 g magnesium oxide (Mallinckrodt)
Method (a) Water was added to an Osterizer(r) mixer and agitated at the slowest speed. (b) The minerals were then added as the agitation continued. (c) After approximately 1 minute the lactic acid was slowly added, over a period of about 5 minutes. (d) The mixer was stopped and the solution allowed to stop swirling. At this point the solution was clear with a yellowish tinge. (e) The mixture was allowed to cool down to about 100° F. (f) It was then freeze-dried. (g) The dried material was broken into a powder and sieved.

Example 2

A combination was made as described in Example 1, except that a complete flavor system was added at step (e) after the mixture cooled to a point that would not harm the ingredients. At a point of about 100° F., a flavor system comprising a color, citric acid (for flavor) and a sweetener were added. Instead of freeze drying, the mixture containing the flavor system was put into a form 1"×6" with the top open and tray dried. Upon drying, the 1"×6" piece had shrunk to about % 2"×5". This was cut into pieces that weighed about 2.7 grams each, which were in the form of "calcium/magnesium" lozenges. The high solubility created a unique tasting sensation that "dissolved smoothly" in the mouth.

Example 3

A combination is made as described in Example 1, except that a flavor system and a gum base are added at step (e) after mixing and before drying. The end product is a "calcium/magnesium" gum with an agreeable flavor.

Example 4

Grape Juice is unique in that it naturally includes tartaric acid. Tartaric acid precipitates calcium. As a result, 100 mg elemental calcium in 8 ounces is considered a high concentration for 100% grape juice. As a demonstration, powder compositions of Formula Examples A, B, C and D were separately mixed with 100% grape juice to provide a concentration 100 mg of elemental calcium in 8 ounces of 100% grape juice. The Formula Examples A, B, C and D of this invention precipitated out of the 100% grape juice within 30 days.

Formula Example F (see Example 6 below) was developed to keep the reconstituted calcium in solution. It contained calcium and magnesium mixed in phosphoric acid and dried according to the present invention. The resulting powder was added to 100% grape juice at an amount equal to 25% of the RDI (250 mg), making a stable, crystal-free solution. Thus, by using a combination of more than one mineral in the process of this invention, one is able to obtain a long lasting solution of calcium (plus the other mineral(s)) in grape juice.

Example 5

Formula Example O is a beverage mix of Formula Example A1 spray dried and mixed with other ingredients to make a beverage. Table 1 shows the stability of this composition.

Example 6

The following formulas are examples of compositions of the present invention. These are the original components that are processed to produce the products of this invention. This list is not intended to be comprehensive, but rather illustrative.

Formula Example A1: 30% solids

| Ingredient | Weight in Grams | % of Mixture |
|---|---|---|
| Calcium Hydroxide | 49.40 | 4.94% |
| Magnesium Oxide | 17.70 | 1.77% |
| Lactic Acid (88%) USP | 262.10 | 26.21% |
| Water | 670.80 | 67.08% |
| TOTAL | 1000.00 | 100.00% |

Formula Example A2: 50% solids

| Ingredient | Weight in Grams | % of Mixture |
|---|---|---|
| Calcium Hydroxide | 83.84 | 8.38% |
| Magnesium Oxide | 30.04 | 3.00% |
| Lactic Acid (88%) USP | 444.84 | 44.48% |
| Water | 441.29 | 44.14% |
| TOTAL | 1000.00 | 100.00% |

Formula Example B:

| Ingredient | Weight in Grams | % of Mixture |
|---|---|---|
| Calcium Carbonate | 78.21 | 8.69% |
| Lactic Acid (88%) USP | 195.66 | 21.74% |
| Water | 626.13 | 69.57% |
| TOTAL | 900.00 | 100.00% |

Formula Example C:

| Ingredient | Weight in Grams | % of Mixture |
|---|---|---|
| Calcium Hydroxide | 26.66 | 6.53% |
| Magnesium Carbonate | 8.49 | 2.08% |
| Lactic Acid (88%) USP | 88.83 | 21.76% |
| Water | 284.26 | 69.63% |
| TOTAL | 408.24 | 100.00% |

Formula Example D:

| Ingredient | Weight in Grams | % of Mixture |
|---|---|---|
| Calcium Hydroxide | 1,285.00 | 12.85% |
| Acetic Acid - Glacial | 1,763.00 | 17.63% |
| Lactic Acid (88%) USP | 554.00 | 5.54% |
| Water | 6,398.00 | 63.98% |
| TOTAL | 10,000.00 | 100.00% |

Formula Example E:

| Ingredient | Weight in Grams | % of Mixture |
|---|---|---|
| Calcium Hydroxide USP | 50.0 | 4.42% |
| Sucralose | 0.8 | 0.07% |
| Lactic Acid (88%) USP | 157.3 | 13.89% |
| Water | 670.80 | 81.62% |
| TOTAL | 1000.00 | 100.00% |

Formula Example F:

| Ingredient | Weight in Grams | % of Mixture |
|---|---|---|
| Calcium Magnesium mix 5:2 | 84 | 8.4% |
| Phosphoric Acid | 300 | 30.1% |
| Water | 613 | 61.5% |
| TOTAL | 997 | 100.0% |

Formula Example G:

| Ingredient | Weight in Grams | % of Mixture |
| --- | --- | --- |
| Magnesium Oxide | 63.5 | 7.82% |
| Citric Acid | 135.0 | 16.64% |
| Water | 613.0 | 75.54% |
| TOTAL | 811.5 | 100.00% |

Formula Example H:

| Ingredient | Weight in Grams | % of Mixture |
| --- | --- | --- |
| Potassium Carbonate | 240 | 15% |
| Lactic Acid (88%) USP | 720 | 75% |
| TOTAL | 960 | 100% |

Formula Example I:

| Ingredient | Weight in Grams | % of Mixture |
| --- | --- | --- |
| Potassium Carbonate | 120.0 | 27.18% |
| Phosphoric Acid (75%) | 200.0 | 45.30% |
| Citric Acid | 45.0 | 10.19% |
| Water | 76.5 | 17.73% |
| TOTAL | 44.5 | 100.00% |

Formula Example J:

| Ingredient | Weight in Grams | % of Mixture |
| --- | --- | --- |
| Magnesium Carbonate | 18.4 | 3.67% |
| Potassium Carbonate | 40.2 | 8.01% |
| Phosphoric Acid (75%) | 170.46 | 33.98% |
| Water | 272.6 | 54.34% |
| TOTAL | 501.66 | 100.00% |

Formula Example K:

| Ingredient | Weight in Grams | % of Mixture |
| --- | --- | --- |
| Calcium Hydroxide | 5.00 | 3.97% |
| Ascorbic Acid | 21.05 | 16.70% |
| Water | 100.00 | 79.33% |
| TOTAL | 1000.00 | 100.00% |

Formula Example L:

| Ingredient | Weight in Grams | % of Mixture |
| --- | --- | --- |
| Calcium Hydroxide | 98.5 | 13.37% |
| Zinc Carbonate | 1.7 | 0.23% |

-continued

Formula Example L:

| Ingredient | Weight in Grams | % of Mixture |
| --- | --- | --- |
| Lactic Acid (88%) USP | 282.9 | 38.40% |
| Water | 353.6 | 48.00% |
| TOTAL | 126.05 | 100.00% |

Formula Example M:

| Ingredient | Weight in Grams | % of Mixture |
| --- | --- | --- |
| Calcium Hydroxide | 40.00 | 6.10% |
| Magnesium Oxide | 14.30 | 2.17% |
| Potassium Carbonate | 3.90 | 0.60% |
| Zinc Gluconate | 2.40 | 0.36% |
| Lactic Acid (88%) USP | 242.60 | 36.94% |
| Water | 353.50 | 53.83% |
| TOTAL | 656.70 | 100.00% |

Formula Example N:

| Ingredient | Weight in Grams | % of Mixture |
| --- | --- | --- |
| Calcium Hydroxide | 36.99 | 1.47% |
| Magnesium Oxide | 13.23 | 4.11% |
| Fructose | 150.84 | 16.76% |
| Lactic Acid (88%) USP | 196.38 | 21.82% |
| Water | 502.56 | 54.84% |
| TOTAL | 900 | 100.00% |

Formula Example O; Mixed in 64 ounces of water:

| Ingredient | Weight in grams | % of Mixture |
| --- | --- | --- |
| Formula Example A2 (spray dried) | 37.412 | 71.54% |
| Flavor Mutual Flavors #P267 | 0.661 | 1.26% |
| Sucralose | 0.073 | 0.14% |
| Potassium Benzoate | 1.1 | 2.10% |
| TOTAL | 52.296 | 100.00% |

To quantitize the amount of magnesium needed to enhance the solubility and long term stability of calcium in aqueous solutions according to the present invention, as inherently disclosed above, the following data was collected for calcium and magnesium solutions made according to variations of Formula Example B1, and summarized below in Tables 3, 4 and 5. In each of Tables 3-5, a "↓" indicates that calcium has begun to drop out of solution and a "✸" indicates that the solution remains clear.

TABLE 3

| Ca:Mg wt ratio | 2000 mg Calcium per 8 oz Water Days from Initial Solubilizing | | | | | | | | | | | | |
|---|---|---|---|---|---|---|---|---|---|---|---|---|---|
| | 0.5 | 1 | 2 | 3 | 4 | 5 | 6 | 7 | 8 | 9 | 10 | 11 | 12 | 13 |
| 1000:0    | ↓ | ↓ | ↓ | ↓ | ↓ | ↓ | ↓ | ↓ | ↓ | ↓ | ↓ | ↓ | ↓ | ↓ |
| 1000:1    | ↓ | ↓ | ↓ | ↓ | ↓ | ↓ | ↓ | ↓ | ↓ | ↓ | ↓ | ↓ | ↓ | ↓ |
| 1000:10   | ¤ | ↓ | ↓ | ↓ | ↓ | ↓ | ↓ | ↓ | ↓ | ↓ | ↓ | ↓ | ↓ | ↓ |
| 1000:20   | ¤ | ¤ | ¤ | ¤ | ↓ | ↓ | ↓ | ↓ | ↓ | ↓ | ↓ | ↓ | ↓ | ↓ |
| 1000:50   | ¤ | ¤ | ¤ | ¤ | ¤ | ¤ | ¤ | ¤ | ↓ | ↓ | ↓ | ↓ | ↓ | ↓ |
| 1000:100  | ¤ | ¤ | ¤ | ¤ | ¤ | ¤ | ¤ | ¤ | ¤ | ¤ | ¤ | ¤ | ¤ | ¤ |
| 1000:200  | ¤ | ¤ | ¤ | ¤ | ¤ | ¤ | ¤ | ¤ | ¤ | ¤ | ¤ | ¤ | ¤ | ¤ |
| 1000:250  | ¤ | ¤ | ¤ | ¤ | ¤ | ¤ | ¤ | ¤ | ¤ | ¤ | ¤ | ¤ | ¤ | ¤ |
| 1000:333  | ¤ | ¤ | ¤ | ¤ | ¤ | ¤ | ¤ | ¤ | ¤ | ¤ | ¤ | ¤ | ¤ | ¤ |
| 1000:400  | ¤ | ¤ | ¤ | ¤ | ¤ | ¤ | ¤ | ¤ | ¤ | ¤ | ¤ | ¤ | ¤ | ¤ |
| 1000:500  | ¤ | ¤ | ¤ | ¤ | ¤ | ¤ | ¤ | ¤ | ¤ | ¤ | ¤ | ¤ | ¤ | ¤ |
| 1000:1000 | ¤ | ¤ | ¤ | ¤ | ¤ | ¤ | ¤ | ¤ | ¤ | ¤ | ¤ | ¤ | ¤ | ¤ |

TABLE 4

| Ca:Mg wt ratio | 1500 mg Calcium per 8 oz Water Days from Initial Solubilizing | | | | | | | | | | | | |
|---|---|---|---|---|---|---|---|---|---|---|---|---|---|
| | 0.5 | 1 | 2 | 3 | 4 | 5 | 6 | 7 | 8 | 9 | 10 | 11 | 12 | 13 |
| 1000:0    | ↓ | ↓ | ↓ | ↓ | ↓ | ↓ | ↓ | ↓ | ↓ | ↓ | ↓ | ↓ | ↓ | ↓ |
| 1000:1    | ↓ | ↓ | ↓ | ↓ | ↓ | ↓ | ↓ | ↓ | ↓ | ↓ | ↓ | ↓ | ↓ | ↓ |
| 1000:10   | ¤ | ¤ | ¤ | ¤ | ¤ | ¤ | ↓ | ↓ | ↓ | ↓ | ↓ | ↓ | ↓ | ↓ |
| 1000:20   | ¤ | ¤ | ¤ | ¤ | ¤ | ¤ | ¤ | ↓ | ↓ | ↓ | ↓ | ↓ | ↓ | ↓ |
| 1000:50   | ¤ | ¤ | ¤ | ¤ | ¤ | ¤ | ¤ | ¤ | ¤ | ¤ | ¤ | ¤ | ¤ | ¤ |
| 1000:100  | ¤ | ¤ | ¤ | ¤ | ¤ | ¤ | ¤ | ¤ | ¤ | ¤ | ¤ | ¤ | ¤ | ¤ |
| 1000:200  | ¤ | ¤ | ¤ | ¤ | ¤ | ¤ | ¤ | ¤ | ¤ | ¤ | ¤ | ¤ | ¤ | ¤ |
| 1000:250  | ¤ | ¤ | ¤ | ¤ | ¤ | ¤ | ¤ | ¤ | ¤ | ¤ | ¤ | ¤ | ¤ | ¤ |
| 1000:333  | ¤ | ¤ | ¤ | ¤ | ¤ | ¤ | ¤ | ¤ | ¤ | ¤ | ¤ | ¤ | ¤ | ¤ |
| 1000:400  | ¤ | ¤ | ¤ | ¤ | ¤ | ¤ | ¤ | ¤ | ¤ | ¤ | ¤ | ¤ | ¤ | ¤ |
| 1000:500  | ¤ | ¤ | ¤ | ¤ | ¤ | ¤ | ¤ | ¤ | ¤ | ¤ | ¤ | ¤ | ¤ | ¤ |
| 1000:1000 | ¤ | ¤ | ¤ | ¤ | ¤ | ¤ | ¤ | ¤ | ¤ | ¤ | ¤ | ¤ | ¤ | ¤ |

TABLE 5

| Ca:Mg wt ratio | 1000 mg Calcium per 8 oz Water Days from Initial Solubilizing | | | | | | | | | | | | |
|---|---|---|---|---|---|---|---|---|---|---|---|---|---|
| | 0.5 | 1 | 2 | 3 | 4 | 5 | 6 | 7 | 8 | 9 | 10 | 11 | 12 | 13 |
| 1000:0    | ¤ | ↓ | ↓ | ↓ | ↓ | ↓ | ↓ | ↓ | ↓ | ↓ | ↓ | ↓ | ↓ | ↓ |
| 1000:1    | ¤ | ↓ | ↓ | ↓ | ↓ | ↓ | ↓ | ↓ | ↓ | ↓ | ↓ | ↓ | ↓ | ↓ |
| 1000:10   | ¤ | ¤ | ¤ | ¤ | ¤ | ¤ | ¤ | ¤ | ¤ | ¤ | ¤ | ¤ | ¤ | ¤ |
| 1000:20   | ¤ | ¤ | ¤ | ¤ | ¤ | ¤ | ¤ | ¤ | ¤ | ¤ | ¤ | ¤ | ¤ | ¤ |
| 1000:50   | ¤ | ¤ | ¤ | ¤ | ¤ | ¤ | ¤ | ¤ | ¤ | ¤ | ¤ | ¤ | ¤ | ¤ |
| 1000:100  | ¤ | ¤ | ¤ | ¤ | ¤ | ¤ | ¤ | ¤ | ¤ | ¤ | ¤ | ¤ | ¤ | ¤ |
| 1000:200  | ¤ | ¤ | ¤ | ¤ | ¤ | ¤ | ¤ | ¤ | ¤ | ¤ | ¤ | ¤ | ¤ | ¤ |
| 1000:250  | ¤ | ¤ | ¤ | ¤ | ¤ | ¤ | ¤ | ¤ | ¤ | ¤ | ¤ | ¤ | ¤ | ¤ |
| 1000:333  | ¤ | ¤ | ¤ | ¤ | ¤ | ¤ | ¤ | ¤ | ¤ | ¤ | ¤ | ¤ | ¤ | ¤ |
| 1000:400  | ¤ | ¤ | ¤ | ¤ | ¤ | ¤ | ¤ | ¤ | ¤ | ¤ | ¤ | ¤ | ¤ | ¤ |
| 1000:500  | ¤ | ¤ | ¤ | ¤ | ¤ | ¤ | ¤ | ¤ | ¤ | ¤ | ¤ | ¤ | ¤ | ¤ |
| 1000:1000 | ¤ | ¤ | ¤ | ¤ | ¤ | ¤ | ¤ | ¤ | ¤ | ¤ | ¤ | ¤ | ¤ | ¤ |

The data from Tables 3, 4 and 5 documents that the increased stability of solubilized calcium resulting from the inclusion of solubilized magnesium according to the present invention, occurs at all nutritionally significant concentrations, including all RDI levels for adults, children, infants and others. Of course solutions of 1500 mg to 2000 mg or more of calcium per 8 oz of water are considered to be very highly concentrated and solutions of 250 to 1000 mg calcium would be expected to be more commercially available, while remaining nutritionally significant. Referring particularly to the data of Table 5, it can be seen that magnesium solubilized according to the present invention is enhancing the stability of solubilized calcium significantly, even at low concentrations of solubilized magensium. In other words, it is clear that Ca:Mg weight ratios of from 1000:20 to 1000:1000 according to the methods of the present invention all exhibit improved solubilized calcium stability. However, Ca:Mg weight ratios of 1000:100 to 1000:500 are preferred when practicing the present invention, and weight ratios of 1000:250 to 1000:400 most preferred.

It can now be appreciated that reference has been made herein in detail to presently preferred embodiments of the invention. It is intended that all matter contained in the description above shall be interpreted as illustrative and not in a limiting sense. Moreover, other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method of making a powder for human or animal consumption having improved organoleptic qualities, comprising:
    making an aqueous slurry containing calcium and magnesium;
    fully solubilizing said aqueous slurry in an aqueous acid solution to produce a solution containing solubilized calcium and magnesium; and
    drying said solution containing solubilized calcium and magnesium to produce a dried, readily solubilizable product having an amorphous structure, wherein the product is adapted for human consumption in a form selected from the group consisting of
        (i) solubilized in an aqueous solution to produced solubilized calcium and solubilized magnesium, such that solubilized magnesium is present in an amount effective to enhance the solubility and long term stability of the solubilized calcium,
        (ii) a dried powder in granular form,
        (iii) a dried powder in tabular form,
        (iv) incorporated into a gum,
        (v) incorporated into pharmaceutical dose,
        (vi) incorporated into a beverage, and
        (vii) incorporated into a food.

2. The method of making a powder for human consumption according to claim 1, wherein the form of the product for human consumption selected is incorporated into a beverage and the beverage is selected from the group consisting of tea, fruit juice, carbonated drinks and sports drinks.

3. The method of making a powder for human consumption according to claim 2, wherein the magnesium and calcium in the product are present in a magnesium:calcium weight ratio of from 1:1 to 1:10.

4. The method of making a powder for human or animal consumption according to claim 2, wherein the product has an individual serving size of at least 250 mg of calcium are present in an individual serving.

5. The method of making a powder for human or animal consumption according to claim 1, wherein the form of the product for human consumption selected is incorporated into a food and the food is selected from the group consisting of candy, gelatin products and puddings.

6. The method of making a powder for human or animal consumption according to claim 5, wherein the magnesium and calcium in the product are present in a magnesium:calcium weight ratio of from 1:1 to 1:10.

7. The method of making a powder for human or animal consumption according to claim 5, wherein the product has an individual serving size of at least 250 mg of calcium are present in an individual serving.

8. The method of making a powder for human or animal consumption according to claim 1, wherein the form of the product for human consumption selected is solubilized in an aqueous solution to produce solubilized calcium and solubilized magnesium, such that solubilized magnesium is present in an amount effective to enhance the solubility and long term stability of the solubilized calcium, and the method further includes the steps of:
    solubilizing the dried compound having an amorphous structure in water to produce a drink containing solubilized calcium and solubilized magnesium; and
    packaging the drink in a sealed container, wherein the drink in the sealed container has a shelf life of at least 6 months with the calcium remaining in solution for said at least 6 months.

9. The method of making a powder for human or animal consumption according to claim 8, wherein the form of the product for human consumption selected is incorporated into a beverage and the beverage is selected from the group consisting of tea, fruit juice, carbonated drinks and sports drinks.

10. The method of making a powder for human or animal consumption according to claim 8, wherein the magnesium and calcium in the product are present in a magnesium:calcium weight ratio of from 1:1 to 1:10.

11. The method of making a powder for human or animal consumption according to claim 9, wherein the magnesium and calcium in the product are present in a magnesium:calcium weight ratio of from 1:1 to 1:10.

12. The method of making a powder for human or animal consumption according to claim 9, wherein the product has an individual serving size of at least 250 mg of calcium are present in an individual serving.

13. The method of making a powder for human or animal consumption according to claim 8, wherein the product has an individual serving size of at least 250 mg of calcium are present in an individual serving.

14. The method of making a powder for human or animal consumption according to claim 1, wherein the magnesium and calcium in the product are present in a magnesium:calcium weight ratio of from 1:1 to 1:10.

15. The method of making a powder for human or animal consumption according to claim 1, wherein the product has an individual serving size of at least 250 mg of calcium are present in an individual serving.

16. A method of making a calcium containing product for subsequent consumption, comprising:
    making an aqueous slurry containing calcium and magnesium;
    acidifying said aqueous slurry to produce an aqueous solution containing solubilized calcium and magnesium while attaining a temperature of at least 130° F.; and
    drying said solution containing solubilized calcium and magnesium to produce a dried product having improved organoleptic properties adapted for incorporation in edible products and for enhanced stability when reconstituted in aqueous solutions.

17. The method of making a calcium containing product according to claim 16, wherein the aqueous solution containing solubilized calcium and magnesium attains the temperature between 130° F. and 190° F.

18. The method of making a calcium containing product according to claim 16, wherein the aqueous solution containing solubilized calcium and magnesium attains the temperature of at least 170° F.

19. The method of making a calcium containing product according to claim 16, wherein the temperature of the aqueous solution containing solubilized calcium and magnesium is attained by an exothermic reaction taking place during the acidification of the aqueous slurry.

20. The method of making a calcium containing product according to claim 16, wherein the temperature of the aqueous solution containing solubilized calcium and magnesium is attained by external heat applied during the acidification of the aqueous slurry.

21. The method of making a calcium containing product according to claim 16, wherein drying said aqueous solution containing solubilized calcium and magnesium comprises a drying method selected from the group consisting of freeze drying, spray drying, tray drying and vacuum drying.

22. The method of making a calcium containing product according to claim 16, wherein drying said aqueous solution containing solubilized calcium and magnesium comprises a freeze drying.

23. The method of making a calcium containing product according to claim 16, further comprising the step of:
adding ingredients to the aqueous solution containing solubilized calcium and magnesium selected from the group consisting of sweeteners, flavors and colors.

24. The method of making a calcium containing product according to claim 16, wherein acidifying said aqueous slurry comprises mixing with the slurry at least one acid selected from the group consisting of lactic acid, malic acid, acetic acid, phosphoric acid, citric acid and ascorbic acid.

25. The method of making a calcium containing product according to claim 16, wherein said dried product is substantially amorphous.

26. The method of making a calcium containing product according to claim 16, wherein said dried product has a substantially non-dendritic morphology.

27. The method of making a calcium containing product according to claim 16, wherein said dried product further comprises potassium.

28. The method of making a calcium containing product according to claim 16, wherein said dried product further comprises zinc.

29. The method of making a calcium containing product according to claim 16, wherein said dried product is fiber-free.

30. The method of making a calcium containing product according to claim 16, wherein said reconstituted aqueous products do not form precipitates comprising calcium for at least six months.

31. The product made by the method of making a calcium containing product according to claim 16.

32. A liquid supplement comprising:
water;
solubilized calcium; and
solubilized magnesium,
wherein the solubilized calcium and solubilized magnesium is provided by the product of claim 31.

33. The liquid supplement of claim 32, wherein said supplement comprises a mineral selected from the group consisting of potassium and zinc.

34. The liquid supplement of claim 32, wherein the supplement comprises at least one ingredient selected from the group consisting of sweeteners, flavors and colors.

35. The liquid supplement of claim 22, wherein the supplement contains at least 500 milligrams of solubilized calcium per 8 fluid ounces of the supplement.

36. The liquid supplement of 32 claim, wherein the solubilized calcium is operative for remaining in solution in the supplement without precipitating therefrom for at least 6 months.

37. A method of making a calcium containing product for subsequent consumption, comprising:
making an aqueous slurry containing calcium and magnesium;
acidifying said aqueous slurry to produce an aqueous solution containing solubilized calcium and magnesium while attaining a temperature of at least 130° F.; and
drying said solution containing solubilized calcium and magnesium to produce a dried product having an at least partially amorphous structure and improved organoleptic properties adapted for incorporation in edible products and for enhanced stability when reconstituted in aqueous solutions.

38. The method of making a calcium containing product according to claim 37, wherein the aqueous solution containing solubilized calcium and magnesium attains the temperature between 130° F. and 190° F.

39. The method of making a calcium containing product according to claim 37, wherein the aqueous solution containing solubilized calcium and magnesium attains the temperature of at least 170° F.

40. The method of making a calcium containing product according to claim 37, wherein the temperature of the aqueous solution containing solubilized calcium and magnesium is attained by an exothermic reaction taking place during the acidification of the aqueous slurry.

41. The method of making a calcium containing product according to claim 37, wherein the temperature of the aqueous solution containing solubilized calcium and magnesium is attained by external heat applied during the acidification of the aqueous slurry.

42. The method of making a calcium containing product according to claim 37, wherein drying said aqueous solution containing solubilized calcium and magnesium comprises a drying method selected from the group consisting of freeze drying, spray drying, tray drying and vacuum drying.

43. The method of making a calcium containing product according to claim 37, wherein drying said aqueous solution containing solubilized calcium and magnesium comprises a freeze drying.

44. The method of making a calcium containing product according to claim 37, further comprising the step of:
adding ingredients to the aqueous solution containing solubilized calcium and magnesium selected from the group consisting of sweeteners, flavors and colors.

45. The method of making a calcium containing product according to claim 37, wherein acidifying said aqueous slurry comprises mixing with the slurry at least one acid selected from the group consisting of lactic acid, malic acid, acetic acid, phosphoric acid, citric acid and ascorbic acid.

46. The method of making a calcium containing product according to claim 37, wherein said dried product has a substantially non-dendritic morphology.

47. The method of making a calcium containing product according to claim 37, wherein said dried product further comprises potassium.

48. The method of making a calcium containing product according to claim 37, wherein said dried product further comprises zinc.

49. The method of making a calcium containing product according to claim 37, wherein said dried product is fiber-free.

50. The method of making a calcium containing product according to claim 37, wherein said reconstituted aqueous products do not form precipitates comprising calcium for at least six months.

51. The product made by the method of making a calcium containing product according to claim 37.

52. A liquid supplement comprising:
water;
solubilized calcium; and
solubilized magnesium,
wherein the solubilized calcium and solubilized magnesium is provided by the product of claim 51.

53. The liquid supplement of claim 52, wherein said supplement comprises a mineral selected from the group consisting of potassium and zinc.

54. The liquid supplement of claim 52, wherein the supplement comprises at least one ingredient selected from the group consisting of sweeteners, flavors and colors.

55. The liquid supplement of claim 52, wherein the supplement contains at least 500 milligrams of solubilized calcium per 8 fluid ounces of the supplement.

56. The liquid supplement of 52 claim, wherein the solubilized calcium is operative for remaining in solution in the supplement without precipitating therefrom for at least 6 months.

* * * * *